C. D. McARTHUR.
ROD CONNECTION.
APPLICATION FILED DEC. 18, 1915.
1,200,000.
Patented Oct. 3, 1916.
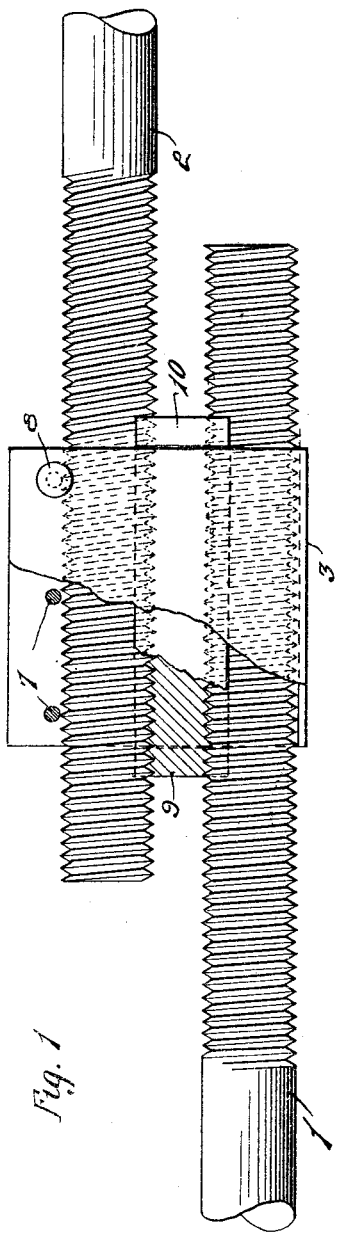
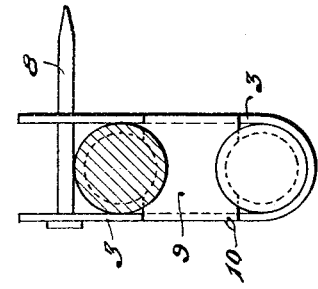
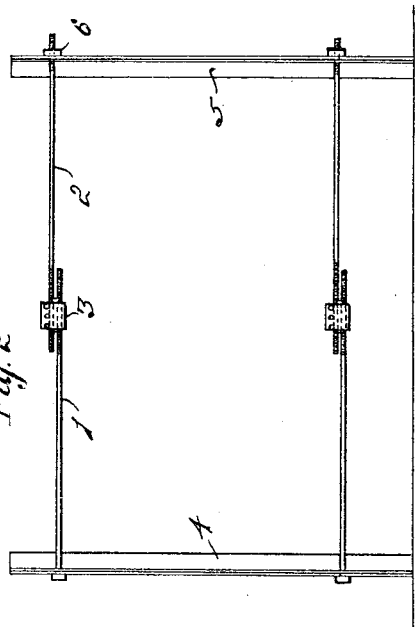
WITNESS:
INVENTOR.
Charles D. McArthur
ATTORNEYS.

UNITED STATES PATENT OFFICE.

CHARLES D. McARTHUR, OF PITTSBURGH, PENNSYLVANIA, ASSIGNOR TO BLAW STEEL CONSTRUCTION COMPANY, OF HOBOKEN, PENNSYLVANIA, A CORPORATION OF NEW JERSEY.

ROD CONNECTION.

1,200,000.     Specification of Letters Patent.     Patented Oct. 3, 1916.

Application filed December 18, 1915. Serial No. 67,562.

*To all whom it may concern:*

Be it known that I, CHARLES D. MC-ARTHUR, a citizen of the United States, residing at Pittsburgh, in the county of Allegheny and State of Pennsylvania, have invented certain new and useful Improvements in Rod Connections, of which the following is a specification.

The invention relates to rod connections and particularly to adjustable connections for rods provided with threads or corrugations. The invention has for its primary objects, the provision of a connection which can be more quickly and easily applied than the ordinary turnbuckle and sleeve nut connection, which does not require both right and left hand threads on the rods to be connected, which affords a secure connection, and which is of very cheap construction. One embodiment of the invention is illustrated in the accompanying drawing, wherein—

Figure 1 is a side elevation, partly in section, of the improved connection, Fig. 2 is a side elevation on a reduced scale, showing one means of employing the invention, and Fig. 3 is an end elevation of the connecting means of Fig. 1.

As indicated in Fig. 2, 1 and 2 are rods which are to be connected, 3 is the connecting sleeve, and 4 and 5 are members to be connected by the rods, the outer ends of the rods being provided with heads or nuts 6.

Referring to Figs. 1 and 3, which illustrate the details of the connecting device, it will be noted that the sleeve 3 is of U-shape and that the free edges of the sleeve are perforated as indicated at 7 for the insertion of nails 8 or other transverse holding means.

Intermediate the threaded ends of the rods is a metal block 9 which has its opposite faces threaded to fit the threads on the ends of the rods 1 and 2. The block 9 may be made by pressing the threads or by machining the block. The ends of the block at the sides thereof are extended out as indicated at 10 (Figs. 1 and 3), so that they come flush with the outer faces of the sleeve, thus giving an interlocking connection with the sleeve so that after the parts are locked in position the block cannot be slid endwise through the sleeve.

In applying the connection the ends of the rods are brought into parallelism, as indicated in Fig. 1, with the block 9 lying therebetween, after which the sleeve 3 is slipped over the rods and block. The distance between the faces of the sleeve is equal to the diameter of the rods, and the proportion of the parts is such that when the nails are inserted they press against the threaded surface of the rod so that an appreciable force is required to drive them into position. They are thus held frictionally against accidental removal and the threads on the block and the rods are made to interlock, so that their full holding effect is secured, and the joint is substantially without lost motion. If it is desired to place tension upon the rods this can be done by applying Stilson wrenches to the rods and rotating one of them so as to screw it longitudinally of the block 9.

It will be seen that the connection, as illustrated and described, is an inexpensive one, particularly if the threads are pressed into the block 9, and that the connection can be more quickly applied than the ordinary turnbuckle, since the parts are assembled in substantially their final position and only a limited amount of turning is required to apply tension to the rods. The construction is such that there is no possibility of improper or insecure connection being made even by unskilled labor, and the ordinary right-hand threading is all that is required upon the rods, as opposed to the right and left hand threading necessary with the turnbuckle and sleeve nut. Other advantages incident to the construction will be readily apparent to those skilled in the art.

What I claim is:

1. The combination with a pair of rods having their ends parallel and provided with corrugations, of a block between the rods fitting the corrugations, a U-shaped sleeve fitting around the ends of the rods and the block, and releasable holding means for the open side of the sleeve.

2. A connecting means for a pair of rods having their ends parallel and corrugated, comprising a block adapted to lie between the ends of the rods and fit such rods, a U-shaped sleeve adapted to fit around the ends of the rods and the blocks, and releasable holding means for the open side of the sleeve.

3. The combination with a pair of rods having their ends parallel and threaded, of a block between the rods having its sides threaded to correspond with the threading of the rods, a U-shaped sleeve fitting around the rod ends and the block, and releasable securing means for the open side of the sleeve.

4. A connecting means for a pair of rods having their ends parallel and threaded, comprising a block adapted to lie between the ends of the rods, and having its sides threaded to correspond with the threading of the rod ends, a U-shaped sleeve adapted to fit around the rod ends and the block, and releasable securing means for the open side of the sleeve.

5. The combination with a pair of rods having their ends parallel and threaded, of a block between the rods having its sides threaded to correspond with the threading of the rods, a U-shaped sleeve fitting around the rod ends and the block and perforated adjacent its open side, and removable securing rods extending through the perforations in the sleeve and engaging one of the rods.

6. A connecting means for a pair of rods having their ends parallel and threaded, comprising a block adapted to lie between the ends of the rods, and having its sides threaded to correspond with the threading of the rod ends, a U-shaped sleeve adapted to fit around the rod ends and the block and perforated adjacent its open side, and removable securing rods extending through the perforations in the sleeve and engaging one of the rods.

7. The combination with a pair of rods having their ends parallel and threaded, of a block between the rods having its sides threaded to correspond with the threading of the rods, a U-shaped sleeve fitting around the rod ends and the block, and releasable securing means for the open side of the sleeve, the said block being formed so as to interlock with the sleeve and prevent relative longitudinal movement.

8. A connecting means for a pair of rods having their ends parallel and threaded, comprising a block adapted to lie between the ends of the rods, and having its sides threaded to correspond with the threading of the rod ends, a U-shaped sleeve adapted to fit around the rod ends and the block, and releasable securing means for the open side of the sleeve, the block and sleeve being arranged to interlock and prevent relative longitudinal movement.

9. The combination with a pair of rods having their ends parallel and threaded, of a block between the rods having its sides threaded to correspond with the threading of the rods and having shoulders at its opposite ends, a U-shaped sleeve slidably mounted on the block between the shoulders and fitting around the rod ends and the block, and releasable securing means for the open side of the sleeve.

CHAS. D. McARTHUR.

Copies of this patent may be obtained for .. .. .ch, by addressing the "Commissioner of Patents, Washington, D. C."